(12) United States Patent
Sun et al.

(10) Patent No.: US 7,139,149 B1
(45) Date of Patent: Nov. 21, 2006

(54) ADAPTING COMPENSATION FOR REPEATABLE RUNOUT OF SECTORS BASED ON TRACKED SECTOR ADAPTATION STATUS

(75) Inventors: Yu Sun, Fremont, CA (US); David Jeppson, Livermore, CA (US); Dwight Kinney, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 76 days.

(21) Appl. No.: 10/963,673

(22) Filed: Oct. 13, 2004

Related U.S. Application Data

(60) Provisional application No. 60/576,873, filed on Jun. 3, 2004.

(51) Int. Cl.
*G11B 5/596* (2006.01)
*G11B 21/02* (2006.01)
(52) U.S. Cl. .................. 360/77.04; 360/77.02
(58) Field of Classification Search .............. 360/77.04
See application file for complete search history.

(56) References Cited

U.S. PATENT DOCUMENTS

| | | | |
|---|---|---|---|
| 5,550,685 A * | 8/1996 | Drouin .................... 360/77.08 |
| 5,585,976 A | 12/1996 | Pham ...................... 360/77.04 |
| 6,545,835 B1 * | 4/2003 | Codilian et al. .......... 360/77.04 |
| 6,707,635 B1 * | 3/2004 | Codilian et al. .......... 360/77.04 |
| 6,765,747 B1 * | 7/2004 | Sun et al. ................ 360/77.04 |
| 6,859,341 B1 * | 2/2005 | Min et al. ................ 360/77.04 |
| 6,999,267 B1 * | 2/2006 | Melkote et al. .......... 360/77.04 |
| 2002/0034037 A1 | 3/2002 | Kusumoto ............... 360/77.04 |
| 2002/0034038 A1 | 3/2002 | Ahn ........................ 360/77.04 |
| 2002/0039248 A1 | 4/2002 | Liu et al. ................. 360/77.04 |
| 2003/0184909 A1 | 10/2003 | Zhang et al. ............ 360/77.04 |

\* cited by examiner

*Primary Examiner*—Wayne Young
*Assistant Examiner*—Jason Olson
(74) *Attorney, Agent, or Firm*—Myers Bigel Sibley & Sajovec, PA

(57) ABSTRACT

Methods, servo controllers, disk drives, and computer program products are provided for adapting compensation for repeatable runout (RRO) of sectors of a disk in a disk drive. RRO of a plurality of sectors of the disk is compensated. A status of whether the RRO compensation has been adapted is tracked for at least some of the sectors of the disk, and corresponding records are formed based on the statuses. The RRO compensation of the tracked sectors is selectively adapted or not adapted based on the records.

23 Claims, 6 Drawing Sheets

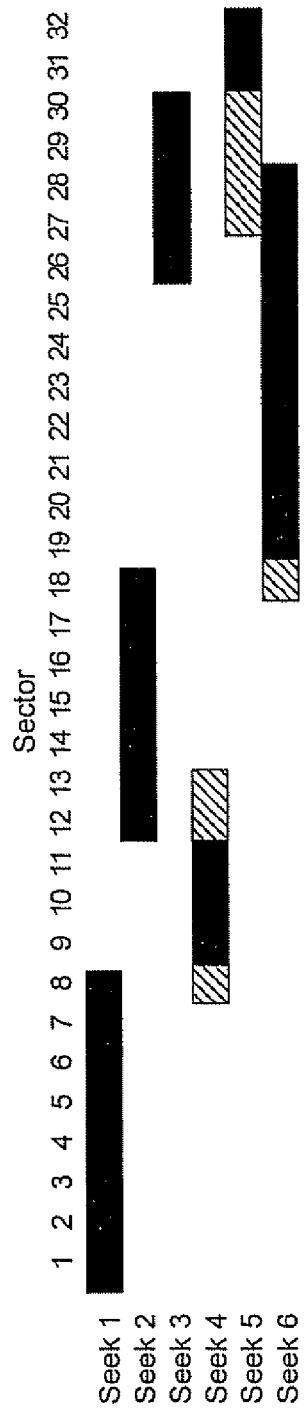

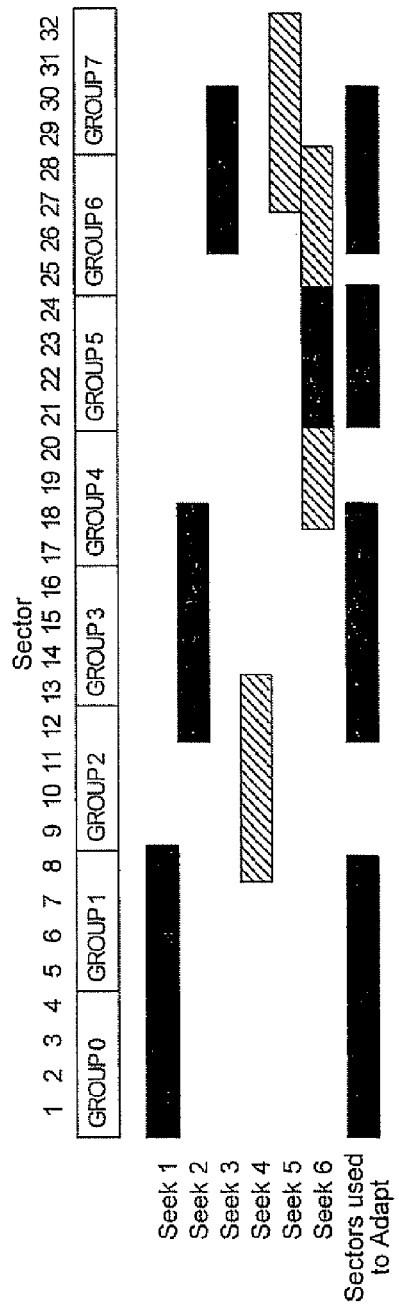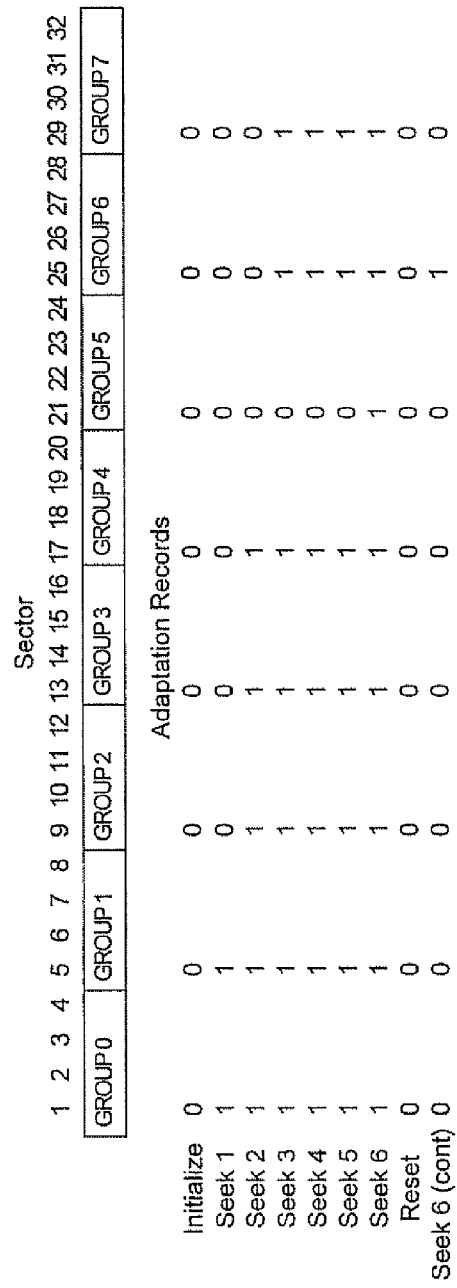

ADAPTING COMPENSATION FOR REPEATABLE RUNOUT OF SECTORS BASED ON TRACKED SECTOR ADAPTATION STATUS

RELATED APPLICATION

This application claims the benefit of and priority to U.S. Provisional Patent Application Ser. No. 60/576,873, filed Jun. 3, 2004, and entitled "ENHANCED PARTIAL REVOLUTION ADAPTATION IN ADAPTIVE RUNOUT COMPENSATION", the disclosure of which is hereby incorporated herein by reference as if set forth in its entirety.

FIELD OF THE INVENTION

The present invention relates to disk drives and, more particularly, to methods, apparatus, and computer program products for positioning transducers in disk drives.

BACKGROUND OF THE INVENTION

Computer disk drives store information on disks or platters. Typically, the information is stored on each disk in concentric tracks. The data tracks are usually divided into sectors. Information is written to and read from a storage surface(s) of a disk by a transducer. The transducer may include a read element separate from a write element, or the read and write elements may be integrated into a single read/write element. The transducer is mounted on an actuator arm capable of moving the transducer radially over the disk. Accordingly, the movement of the actuator arm allows the transducer to access different data tracks. The disk is rotated by a spindle motor to allow the transducer to access different sectors within each track on the disk.

The actuator arm is coupled to a motor or actuator, such as a voice coil motor (VCM), to move the actuator arm such that the transducer moves radially over the disk. Operation of the VCM is controlled by a servo control system. The servo control system generally performs two distinct functions: seek control and track following. The seek control function includes controllably moving the actuator arm such that the transducer is moved from an initial position to a target track position. In general, the seek function is initiated when a host computer associated with the computer disk drive issues a command to read data from or write data to a target track on the disk. Once the transducer has been moved sufficiently close to the target track by the seek function of the control system, the track following function of the servo control system is activated to center and maintain the transducer on the target track until the desired data transfers are completed.

The track following function of the servo control system generally includes maintaining the transducer at a desired position with respect to a track being followed (e.g., over a centerline of the track). Typically, the transducer must be moved slightly during track following to maintain a desired position over the track. This is because, due to various factors, the track may appear to move beneath the transducer. There are numerous outside influences which can make it difficult for the servo control system to maintain the desired position over the track, one such influence is known as "runout."

Runout generally refers to deviation from perfect circular motion and, more particularly, refers to variation in the distance between an external point of reference and a passing surface of a rotating object. "Repeatable runout" involves periodic deviations that occur with predictable regularity (hereafter "RRO"). "Nonrepeatable runout" involves random perturbations due, for example, to bearing slop, shock events, and so on (hereafter NRRO). In the context of a disk drive, RRO is "repeatable" because it occurs in sync with the spinning disk. RRO may be caused by one or more of the following mechanical sources: a) spindle motor runout; b) disk slippage; c) disk warping; d) disturbances converted to RRO during the Servo Writing process due to, for example, NRRO, vibrations, resonances, media defects, or disk distortion due to clamping of the head disk assembly (HDA). RRO may also be caused by electromagnetic imperfections due to low quality servo information (i.e., servo bursts), even if they were mechanically recorded on the ideal circle. Such low quality servo bursts can yield incorrect position information.

The control system may compensate for RRO by sensing the RRO for a servo sector and then moving the transducer to follow expected movement of a track. For example, the control system may feed forward a combination of sinusoidal currents, which correspond to the harmonics of the RRO, and that are combined with a current command to the actuator in an attempt to cancel the RRO. Because RRO can change over time, the compensation can also be adapted based on newly sensed RRO for servo sectors. The RRO compensation should be based on the RRO that is sensed for all sectors around a disk. However, a transducer is often commanded to various different tracks before it can complete a full revolution on a track. Consequently, adaptation of the RRO compensation may be performed in a piece-wise fashion while the transducer is not seeking.

RRO compensation may become significantly distorted, yielding incorrect feed forward currents, if the adaptation is repeatedly performed based on RRO that is sensed for only a portion of a disk. To avoid such distortion, when adaptation is forced to stop, such as due to a seek command, adaptation may not be allowed to resume until the transducer reaches the servo sector that immediately follows the last servo sector for which adaptation has completed. In this manner, the adaptation can be based on all servo sectors of the disk. For high storage density disks that have a significant number of servo sectors, a high seek rate may cause a significant delay in adaptation of the RRO compensation, and which may significantly decrease the ability of the control system to maintain the transducer on track during track following.

SUMMARY OF THE INVENTION

Some embodiments of the present invention provide methods of adapting compensation for repeatable runout (RRO) of sectors of a disk in a disk drive. RRO of a plurality of sectors of the disk is compensated. A status of whether the RRO compensation has been adapted is tracked for at least some of the sectors of the disk, and corresponding records are formed based on the statuses. The RRO compensation of the tracked sectors is selectively adapted or not adapted based on the records.

In some further embodiments of the present invention, the RRO compensation includes sensing RRO of the sectors of the disk, generating a RRO compensation signal based on the sensed RRO, and controlling positioning of a transducer adjacent to the disk based on the RRO compensation signal. An updated RRO is sensed for at least one of the sectors, and the RRO compensation signal is selectively modified or not modified based on the sensed updated RRO for at least one of the sectors and based on the corresponding record. The RRO compensation signal may be modified based on the sensed updated RRO for the sector when the corresponding record indicates that the RRO compensation signal has not been modified based on position data from the sector. In contrast, the RRO compensation signal may not be modified based on the sensed updated RRO for the sector when the corresponding record indicates that the RRO compensation signal has been modified based on position data from the sector.

In some further embodiments of the present invention, at least some of the tracked sectors may each comprise a plurality of servo sectors. Accordingly, the servo sectors may be associated into groups, and the associated records may indicate whether the RRO compensation has been adapted based on one or more servo sectors within the groups. The RRO compensation may then be selectively adapted or not adapted based on the records for the groups.

In some other embodiments of the present invention, a servo controller includes an adaptive repeatable runout compensator. The adaptive repeatable runout compensator is configured to compensate for repeatable runout of a plurality of sectors of a disk, to track for at least some of the sectors of the disk a status of whether the compensation for repeatable runout has been adapted and to form corresponding records based on the statuses, and to selectively adapt or not adapt the compensation for repeatable runout of the tracked sectors based on the records.

In some other embodiments of the present invention, a disk drive includes a data storage disk, a transducer, an actuator, and a servo controller. The transducer is configured to read servo information from the disk. The actuator is configured to position the transducer relative to the disk. The servo controller is configured to control positioning of the transducer by the actuator to compensate for repeatable runout of a plurality of sectors of the disk, to track for at least some of the sectors of the disk a status of whether the compensation for repeatable runout has been adapted and to form corresponding records based on the statuses, and configured to selectively adapt or not adapt the compensation for repeatable runout of the tracked sectors based on the records.

Some other embodiments of the present invention provide a computer program product for adapting compensation for repeatable runout of sectors of a disk in a disk drive. The computer program product includes computer program code embodied in a computer-readable storage medium, and that is configured to compensate for repeatable runout of a plurality of sectors of a disk, to track for at least some of the sectors of the disk a status of whether the compensation for repeatable runout has been adapted and form corresponding records based on the statuses, and to selectively adapt or not adapt the compensation for repeatable runout of the tracked sectors based on the records.

DESCRIPTION OF THE DRAWINGS

FIG. 6 is a graph that illustrates how compensation for repeatable runout is selectively adapted as a transducer moves across sectors of a disk, in accordance with some embodiments of the present invention.

FIG. 7 is a table of adaptation status records that indicates whether compensation for repeatable runout has been adapted, and which may be used to control the selective adaptation shown in the graph of FIG. 6, in accordance with some embodiments of the present invention.

FIG. 8 is a graph that illustrates how compensation for repeatable runout is selectively adapted as a transducer moves across sectors of a disk, in accordance with some other embodiments of the present invention.

FIG. 9 is a table of adaptation status records that indicates whether compensation for repeatable runout has been adapted, and which may be used to control the selective adaptation shown in the graph of FIG. 8, in accordance with some other embodiments of the present invention.

DETAILED DESCRIPTION OF THE INVENTION

Figure 1:
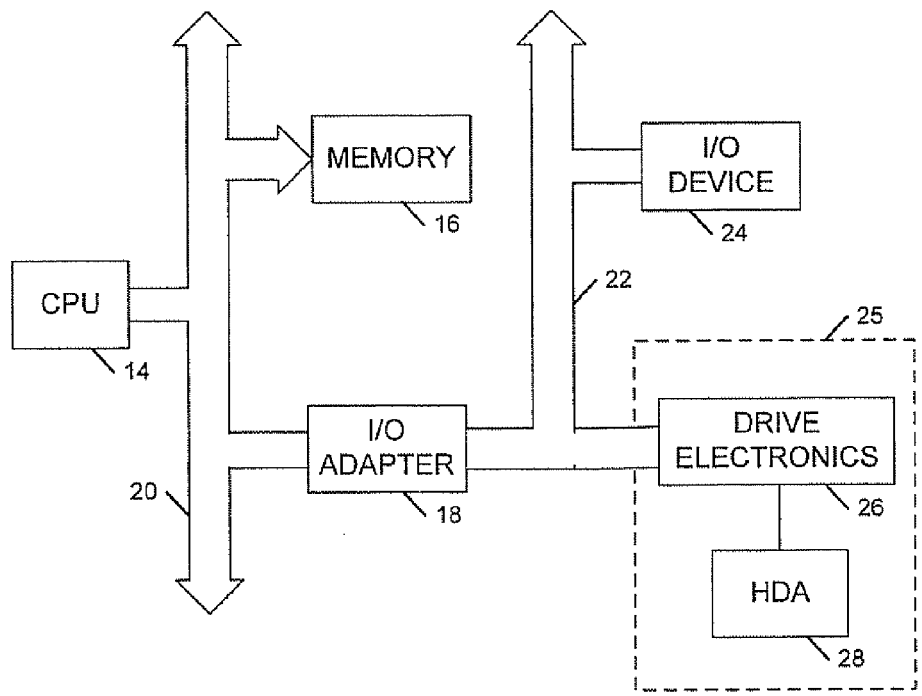
FIG. 1 is a block diagram of an exemplary computer system that includes a disk drive.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items.

The present invention may be embodied as servo controllers, disk drives, methods, and/or computer program products. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disk read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams, including operational flow charts, of servo controllers, disk drives, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Referring to FIG. 1, an exemplary computer system 10 is shown that includes a central processing unit ("CPU") 14, a main memory 16, and I/O bus adapter 18, all interconnected by a system bus 20. Coupled to the I/O bus adapter 18 is I/O bus 22, that may be, for example, a small computer system interconnect (SCSI) bus, firewire bus, and/or a universal serial bus. The I/O bus 22 supports various peripheral devices 24 and a data storage unit such as a disk drive 25. The disk drive 25 includes drive electronics 26 and a head disk assembly 28 ("HDA").

Figure 2:
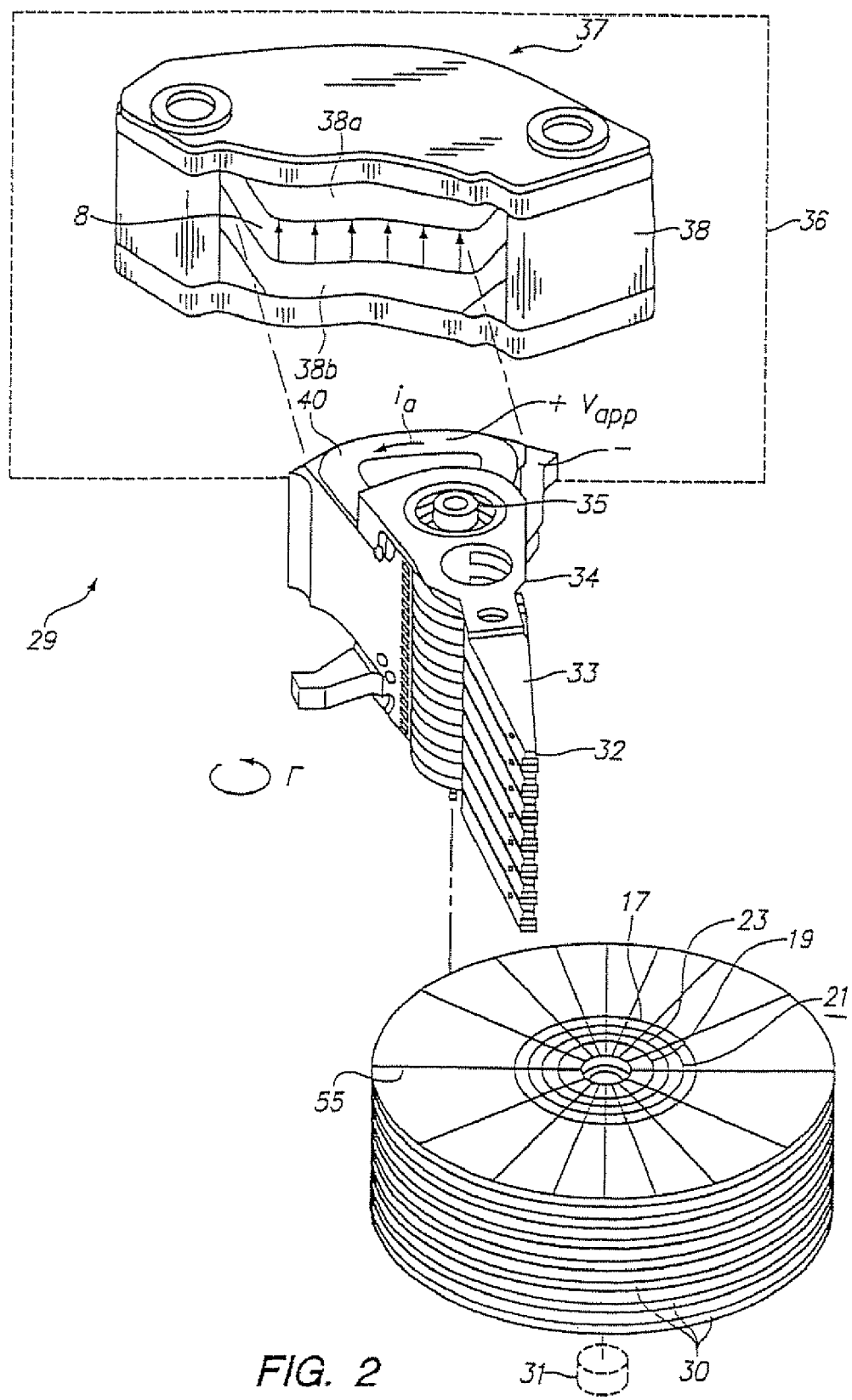
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30 from an initial track 19 towards a target track 21 shown in FIG. 2 by example. At the target track 21, the magnetic transducers 32 can read from and/or write data on the disks 30. A motor 36 controls the radial movement of the actuator arms 34 in proportion to an input actuator current $i_a$. Although the disks 30 are described as magnetic disks for purposes of illustration, the disks 30 may alternatively be optical disks or any other type of storage disk which can have data storage tracks defined on one or both of its storage surfaces.

The exemplary motor 36 can include a magnet 37 containing two plates 38a, 38b coupled together via a pair of sidewalls to form a flat toroidal shaped member 38. A wire coil 40 is disposed between the two plates 38a and 38b. The magnet 37 may generate a constant magnetic field B between the plates 38a and 38b. When the input actuator current $i_a$ is induced in the coil 40 disposed in the magnetic field B, a torque is produced on the actuator arms 34 resulting in radial motion of the arms 34 about pivot point 35. The polarity of the input actuator current $i_a$ determines the direction of radial motion of the actuator arms 34.

Figure 3:
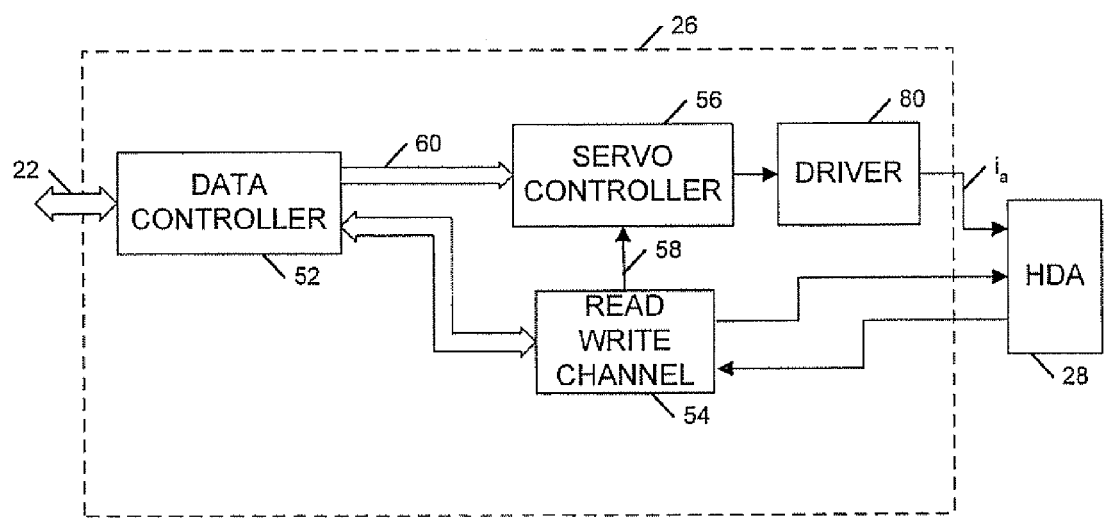
FIG. 3 is a block diagram of the drive electronics of the disk drive according to some embodiments of the present invention.

Referring to FIG. 3, the drive electronics 26 (FIG. 1) can include a data controller 52, a read/write channel 54, a servo controller 56, and a driver 80 according to some embodiments of the present invention. A data transfer initiated by the CPU 14 to the disk drive 25 may involve for example a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58. Specifically, the concentric data tracks 17 on the storage surface of a data disk 30 are divided into segments by a plurality of spaced apart embedded servo sectors 55 (FIG. 2). Each servo sector 55 can include transducer location information that indicates an address of the servo sector 55 and a track address, and burst fields to provide servo fine location information, and which can be used to detect the radial location of the transducer 32 relative to that track. The transducer location information is induced into the transducer 32, converted from analog signals to digital data in the read/write channel 54, and transferred to the servo controller 56. The servo controller 56 can use the transducer location information for performing seek and track following operations of the transducer 32 over the disk tracks 17.

The data controller 52 also provides target track location data on lines 60 to the servo controller 56. The target track location data provides course positioning information to the servo controller 56 for specifying a seek length, wherein the seek length is the radial distance that the actuator arm 34 must move the transducer 32 from, for example, the initial track 19 to reach the target track 21 to which the CPU 14 has requested access.

Figure 4:
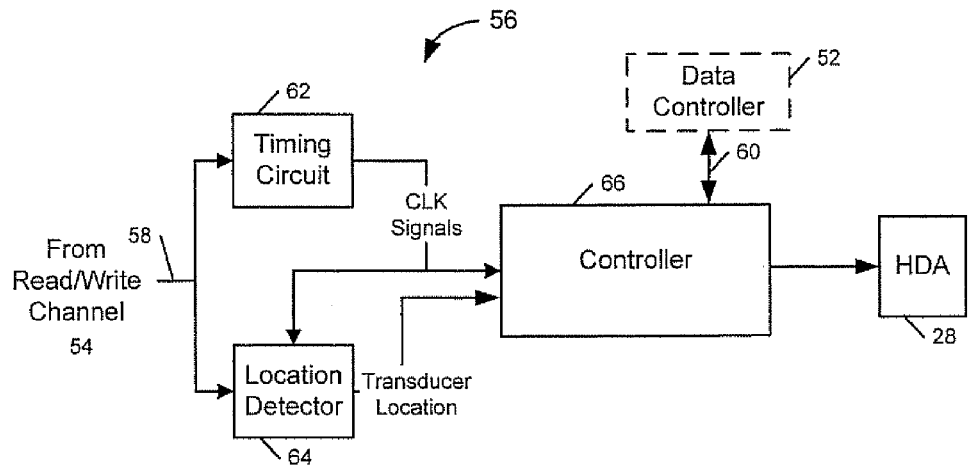
FIG. 4 is a block diagram of the servo controller according to some embodiments of the present invention.

Referring to FIG. 4, the servo controller 56 can include a timing circuit 62, a location detector 64, and a controller 66. The timing circuit 62 can generate clock signals synchronized with the passage of servo sectors 55 on tracks under the transducer 32. The timing circuit 62 can include a counter and a phase locked loop for generating the clock signals. In response to the clock signals from the timing circuit 62, the location detector 64 detects transducer radial location from transducer location data provided by the read/write channel 54 (based on the location information of the servo sectors 55). The detected transducer location information in each servo sector 55 provides the address of the track which contains the servo sector 55, and therefore, the location of the transducer 32 relative to that track. The timing circuit 56 is synchronized with the read/write channel 54, and the location detector 64 receives the transducer location data from the read/write channel 54.

Figure 5:
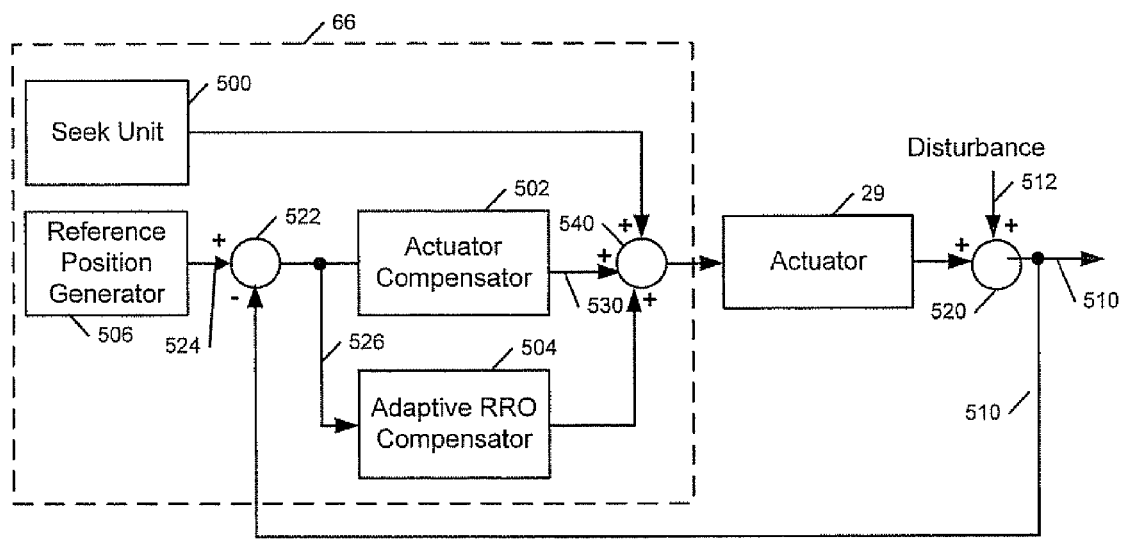
FIG. 5 is a block diagram of a controller, which may be within the servo controller of FIG. 4, that selectively adapts repeatable runout compensation according to some embodiments of the present invention.

The controller 66 can control movement and positioning of the transducer 32 during seek operations and track following operations. Referring to FIG. 5, the controller 66 can include a seek unit 500, an actuator compensator 502, an adaptive repeatable runout (RRO) compensator 504, and a reference position generator 506. The controller 66 may be embodied in hardware and/or software. The controller 66 senses, via the transducer 32, the servo patterns along the track to generate a sensed position signal 510 that indicates a position of the transducer 32 relative to the track. The position of the transducer 32 can depend on a summation, illustrated by summing node 520, of the positioning contributions of the actuator 29 and disturbances 512. The disturbances 512 can include RRO and non-repeatable runout (e.g., aperiodic external shocks).

The sensed position signal 510 is fed-back to a summing node 522, where it is combined with a desired reference position signal 524 to generate a position error signal 526. The desired reference position signal 524 is generated by the reference position generator 506, and may be a DC value (e.g., static value), such as zero, for at least a portion of the revolution of the disks 30, which may drive the transducer 32 (FIG. 2) toward a centerline of a track during track following. The actuator compensator 502 is configured to generate an actuator control signal 530 that controls movement of the actuator 29 based on the position error signal 526 during track following.

The adaptive RRO compensator 504 is configured to generate a RRO compensation signal 532 that is fed-forward to the actuator 29 to compensate for RRO. The RRO compensation signal 532 is combined with the actuator control signal 530 and a control signal from the seek unit 500 at a summing node 540, and provided to the actuator 29 to move the transducer 32. The seek unit 500 can control the actuator 29 to seek between tracks. The adaptive RRO compensator 208 may compensate for RRO by, for example, sensing RRO for individual sectors of each of the disks 30. RRO can be sensed based on the position error signal 526. The sectors may correspond to individual servo sectors and/or they may correspond to groups of servo sectors around the disk 30. Moreover, a plurality of adjacent tracks on the disks 30 may be grouped into zones, such that a plurality of zones are defined radially across the disks 30. Accordingly, RRO may be sensed for individual sectors and zones on each of the disks 30.

The adaptive RRO compensator 208 may associate the sensed RRO values with the sectors, and which may be associated with zones, of the storage surface(s) of each of the disks 30. It may then use an identity of an upcoming sector to generate the RRO compensation signal 532 so as to compensate for the expected RRO (i.e., the sensed RRO values). The adaptive RRO compensator 208 may generate the RRO compensation signal 532 as a combination of sinusoidal currents that correspond to the harmonics of the sensed RRO. The frequency of the currents may be based on the rotational velocity of the disks 30, and the real and imaginary parts of the currents may be based on the position error signal 510. Alternatively, or additionally, the adaptive RRO compensator 208 may generate a table of RRO compensation values that are based on the sensed RRO values, and can be used to generate the RRO compensation signal 532. Compensation for RRO is discussed in U.S. Pat. Nos. 6,549,362 and 5,550,685, the disclosures of which are hereby incorporated by reference herein as if set forth in their entirety.

The adaptive RRO compensator 208 is configured to adapt the RRO compensation so as to track variations of the RRO that may occur over time. Adaptation of the RRO compensation may be carried out by sensing RRO for a sector and corresponding zone, and by modifying the RRO compensation signal 532, which is generated when the transducer 32 is adjacent to that sector and zone, based on the newly sensed RRO. The newly sensed RRO may be filtered (e.g., weighted) when it is used to adapt the RRO compensation, which may allow more stable and/or accurate prediction and adaptation of the time varying RRO characteristics.

The adaptive RRO compensator 208 is configured to track, for a plurality of the sectors of the disks 30, a status of whether the compensation for RRO of the sectors has been adapted, and to form corresponding adaptation records based on the statuses. The adaptive RRO compensator 208 then selectively adapts or not adapts its compensation for RRO of the tracked sectors based on the adaptation records.

The adaptation records may, for example, be associated with each individual servo sector around a disk. The adaptation records may thereby indicate on a sector by sector basis whether position data has been used to adapt the RRO compensation. In another example, the adaptation records may be associated with groups of servo sectors, so that they indicate whether one or more sectors within a group have been used to adapt the RRO compensation. The records may be reset once a predetermined number and/or predetermined ones of the records indicate that the associated tracked sectors have been used to adapt the RRO compensation. The RRO compensation may be adapted more accurately if it is based on all of the tracked sectors before the records are reset (i.e., the predetermined number corresponds to the number of sectors), and/or if adaptation is performed based on sectors that are symmetrically distributed around the disk.

Reference is now made to FIGS. 6–7 and 8–9, which illustrate a selective adaptation of RRO compensation in accordance with some embodiments of the present invention. These embodiments are described in the context of binary adaptation records, wherein each of the records has one binary value that indicates that adaptation has not been performed, and another binary value that indicates that adaptation has been performed. However, it is to be understood that any indication of adaptation status may be used herein, such that any value, signal, or other indication may be used to track and indicate whether adaptation of the RRO compensation has been performed.

FIG. 6 is a graph that illustrates when adaptation is performed and when it is precluded as a transducer moves across sectors of a disk during six sequential seek operations. The solid portions of the horizontal bars indicate that adaptation is performed based on sensed RRO, and the cross hatched portions of the horizontal bars indicate that adaptation is not performed. FIG. 7 is a table of adaptation status records, where a logical 0 value indicates that adaptation has not been performed, and a logic 1 value indicates that adaptation has been performed. For purposes of illustration only, 32 different sectors are tracked (i.e., 1 to 32) for one zone on one of disks 30. As will be appreciated, the sectors may correspond to one or more servo sectors, and a high capacity storage disk may have over 500 servo sectors. Moreover, each of the storage surface(s) of the disk 30 may include a plurality of radial zones, so that a group of adaptation status records are maintained for the sectors in each of the zones. Accordingly, in some embodiments of the invention, if, for example, each storage surface of each of the disks 30 has 500 servo sectors and 16 radial zones, then 8000 (i.e., 500*16) adaptation status records may be maintained and tracked by the adaptive RRO compensator 208 for the each storage surface of each of the disks 30.

In the exemplary embodiment of FIGS. 6 and 7, adaptation is selectively allowed or not allowed for a particular tracked sector based on whether adaptation has previously been performed on that sector since completion of adaptation on all of the other tracked sectors. The adaptation status records are used to track which sectors the RRO compensation has adapted, and which sectors it has not adapted. More particularly, adaptation is performed when the transducer is adjacent to a sector in which the corresponding adaptation status record of FIG. 7, indicates that adaptation has not been performed. Initially, the adaptation status records are set to zero, as shown by the first row, titled "Initialize" in FIG. 7.

In a first seek operation, the transducer is moved to sector 1, and because the corresponding adaptation status record for sector 1 is logic 0, which indicates that adaptation has not been performed on that sector, adaptation is performed on sector 1. The adaptation status record for sector 1 is then changed to logic 1 to indicate that adaptation has been performed. Adaptation continues for sectors 2 through 8 because the corresponding adaptation status records are logic 0, and, as the adaptation of each sector is performed, the corresponding adaptation status records for sectors 2 through 8 are changed to logic 1.

The transducer is then commanded elsewhere and returns by a second seek operation to sector 12, where adaptation is performed on sectors 12 to 18 because the corresponding adaptation status records are logic 0, indicating that adaptation has not been performed on those sectors. The adaptation status records for sectors 12 to 18 are set to logic 1 to indicate that adaptation has been performed on those sectors.

The transducer is then commanded elsewhere and returns by a third seek operation to sector 26, where adaptation is performed on sectors 26 to 30 because the corresponding adaptation status records are logic 0, indicating that adaptation has not been performed on those sectors. The adaptation status records for sectors 26 to 30 are set to logic 1 to indicate that adaptation has been performed on those sectors.

The transducer is then commanded elsewhere and returns by a fourth seek operation to sector 8, where adaptation is not performed because the corresponding adaptation status record for sector 8 is logic 1, indicating that adaptation has already been performed for that sector. Adaptation is performed for the subsequent sectors 9 to 11, as the transducer moves across those sectors, because the corresponding adaptation status records are logic 0. The adaptation status records for sectors 9 to 11 are then changed to logic 1. Adaptation is not performed on sectors 12 or 13 because the associated adaptation status records are logic 1.

The transducer is then commanded elsewhere and returns by a fifth seek operation to sector 27, where adaptation is not performed on sector 27 or subsequent sectors 28 through 30 because the corresponding adaptation status records are logic 1. Adaptation is then performed on subsequent sectors 31 through 32 because the corresponding adaptation status records are logic 0, and those adaptation status records are changed to logic 1.

The transducer is then commanded elsewhere and returns by a sixth seek operation to sector 18, where adaptation is not performed because the corresponding adaptation status record is logic 1. Adaptation is then performed on subsequent sectors 19 through 25 because the corresponding adaptation status records are logic 0. The adaptation status records for sectors 19 to 25 are changed to logic 1.

Each of the adaptation status records now has a logic 1 value, thereby indicating that adaptation has been performed on each of the tracked sectors around the disk. The adaptation status records are now reset to logic 0 (row "Reset" in FIG. 7), and adaptation is allowed to resume on any of the sectors for which the corresponding adaptation status record indicates that adaptation has not been previously performed.

As the transducer continues to move across sectors 26 through 28, adaptation is performed thereon, and the corresponding adaptation status records are set to logic 1, as indicated by the row titled "Seek 6 (cont)" in FIG. 7.

As described with regard to FIGS. 6 and 7, adaptation is selectively allowed or not allowed for a particular tracked sector based on whether adaptation has previously been performed on that sector since completion of adaptation based on RRO sensed for all of the other tracked sectors. Accordingly, the RRO compensation may be adapted based on attributes of the sensed RRO around the disk, which may increase that accuracy with which RRO and its time varying attributes can be measured and compensated by the adaptive RRO compensator 504.

Another exemplary embodiment of selective adaptation of the RRO compensation is illustrated in FIGS. 8 and 9, in accordance with some other embodiments of the present invention. This exemplary embodiment is similar to the exemplary embodiment discussed with regard to FIGS. 6 and 7, except that the adaptation status records now represent a status of adaptation of one or more sectors within a group of four adjacent sectors. Adaptation is selectively allowed or not allowed for a tracked sector based on whether adaptation has previously been performed on one or more of the tracked sectors in the corresponding group.

Initially, the adaptation records are set to zero, as shown by the first row titled "Initialize" in FIG. 9. In a first seek operation, the transducer is moved to sector 1, and because the corresponding adaptation status record for group 0 is logic 0, indicating that adaptation has not been performed on any sectors in that group, adaptation is performed on sector 1. The adaptation record for group 0 is changed to logic 1 to reflect that adaptation has been performed on one or more sectors within that group. Adaptation continues for each of sectors 2 through 4 of group 0 because, although the adaptation record for group 0 has now changed to logic 1, adaptation occurred for an immediately preceding sector within the same group (i.e., for sector 1 in group 0 and so forth) without an intervening seek operation. Adaptation continues for sector 5 because the adaptation record for group 1 is logic 0, and the record for group 1 is then changed to logic 1. Adaptation continues for each of sectors 6 through 8 because, although the adaptation record for group 1 has now changed to logic 1, adaptation occurred for an immediately preceding sector within the same group without an intervening seek operation.

The transducer is then commanded elsewhere and returns by a second seek operation to sector 12, where adaptation is performed because the adaptation record for group 2 is logic 0, and the record for group 2 is then set to logic 1. Adaptation continues for sector 13 because the adaptation record for group 3 is logic 0, and the record for group 3 is then set to logic 1. Adaptation continues for each of sectors 14–16 because, although the adaptation record for group 3 has now changed to logic 1, adaptation occurred for an immediately preceding sector within the same group without an intervening seek operation. Adaptation continues for sector 17 because the adaptation record for group 4 is logic 0, and the record for group 4 is then set to logic 1. Adaptation continues for sector 18 because, although the adaptation record for group 4 has now changed to logic 1, adaptation occurred for an immediately preceding sector within the same group without an intervening seek operation.

The transducer is then commanded elsewhere and returns by a third seek operation to sector 26, where adaptation is performed because the adaptation record for group 6 is logic 0, and the record for group 6 is then set to logic 1. Adaptation continues for sectors 27 and 28 because, although the adaptation record for group 6 has now changed to logic 1, adaptation occurred for an immediately preceding sector within the same group without an intervening operation. Adaptation continues for sector 29 because the adaptation record for group 7 is logic 0, and the record for group 7 is then set to logic 1. Adaptation continues for sector 30 because, although the adaptation record for group 7 has now changed to logic 1, adaptation occurred for an immediately preceding sector within the same group without an intervening seek operation.

The transducer is then commanded elsewhere and returns by a fourth seek operation to sector 8, and continues through sectors 9 through 13. Adaptation is not performed on any of sectors 8 though 13 because the adaptation status records for corresponding groups 1, 2, and 3 are logic 1, indicating that adaptation has already been performed on one or more sectors within each of those groups, and because an intervening seek operation occurred between the earlier adaptation and the present check of the adaptation records.

The transducer is then commanded elsewhere and returns by a fifth seek operation to sector 27, where adaptation is not performed on sector 27 or subsequent sectors 28 through 32 because the adaptation status records for corresponding groups 6 and 7 are logic 1, indicating that adaptation has already been performed on one or more sectors within each of those groups, and because an intervening seek operation occurred between the earlier adaptation and the present check of the adaptation records.

The transducer is then commanded elsewhere and returns by a sixth seek operation to sector 18 and continues through sector 28. Adaptation is not performed for sectors 18–20 because the adaptation status record for corresponding group 4 is logic 1, and because an intervening seek operation occurred between the earlier adaptation and the present check of the adaptation records. Adaptation is performed on sector 21 because the adaptation record of corresponding group 5 is logic 0, and then the record for group 5 is set to logic 1. Adaptation continues for sectors 22 through 24 because, although the adaptation record for group 6 has now changed to logic 1, adaptation occurred for an immediately preceding sector within the same group without an intervening seek operation.

Each of the adaptation status records for the groups now has a logic 1 value, thereby indicating that adaptation has been performed on at least one sector in each of the sector groups around the disk. The adaptation status records are now reset to logic 0 (row "Reset" in FIG. 9), and adaptation is allowed to resume. Adaptation has now been completed for at least one sector of each of the groups 0 through 7 around the disk.

As shown by the row titled "Sectors Used to Adapt" in FIG. 8, according to the illustrated example, the RRO compensation was adapted based on the RRO sensed for sectors 1–8, 12–18, 21–24, and 26–30, and the RRO compensation was not adapted based on sectors 9–11, 19–20, 25, and 31–32. Because, as illustrated in FIG. 8, the RRO compensation may be adapted based on the RRO sensed for only some of the sectors around the disk, the sensed RRO values may be filtered when they are used to adapt the RRO compensation, and modify the generated the RRO compensation signal 532 (FIG. 5).

With continuing reference to FIG. 8, as the transducer continues to move across sectors 25 through 28, adaptation is performed first for sector 25, the corresponding adaptation record of group 6 is changed to logic 1, and adaptation is performed for sectors 26 through 28, as indicated by the row titled "Seek 6 (cont)" in FIG. 9.

Accordingly, tracked sectors are associated with groups, and adaptation is selectively allowed or not allowed for a particular sector based on whether adaptation has previously been performed on one or more sectors within the corresponding group of sectors since completion of adaptation on each of the groups of sectors. When adaptation has been performed on a sector within a group, adaptation is allowed on another sector within the same group when the earlier adaptation was performed on an immediately preceding sector in the same group without an intervening seek operation. By associating the tracked sectors into groups, the amount of memory within the servo controller 56 that is used to track the adaptation records may be reduced. Accordingly, the number of sectors that are grouped together may be selected based on a tradeoff of accuracy of the adaptation, speed of adaptation, and/or memory that may be used to carry out the adaptation. The adaptation may be improved by delaying the carrying out of a commanded seek operation until the RRO compensation has been adapted based on RRO sensed for a predetermined number, and/or predetermined ones, of the sectors or groups of sectors (e.g., all of the sectors/groups).

As was previously described, RRO compensation may vary across a plurality of radial zones on the disk, where each of the zones may include a plurality of adjacent tracks. The selective adaptation that has been described with regard to FIGS. 6–9 may correspond to one of a plurality of radial zones on the disk. Accordingly, it is to be understood that the selective adaptation may be carried out for a plurality of radial zones on the disk by, for example, providing a set of adaptation status records for each sector, or group of sectors, in each of the zones on the disk, and tracking whether the RRO compensation has been adapted for the tracked sectors or groups of sectors within each of the zones. Selective adaptation may then be carried out in the zones based on the adaptation status records that are associated therewith.

Figure 10:
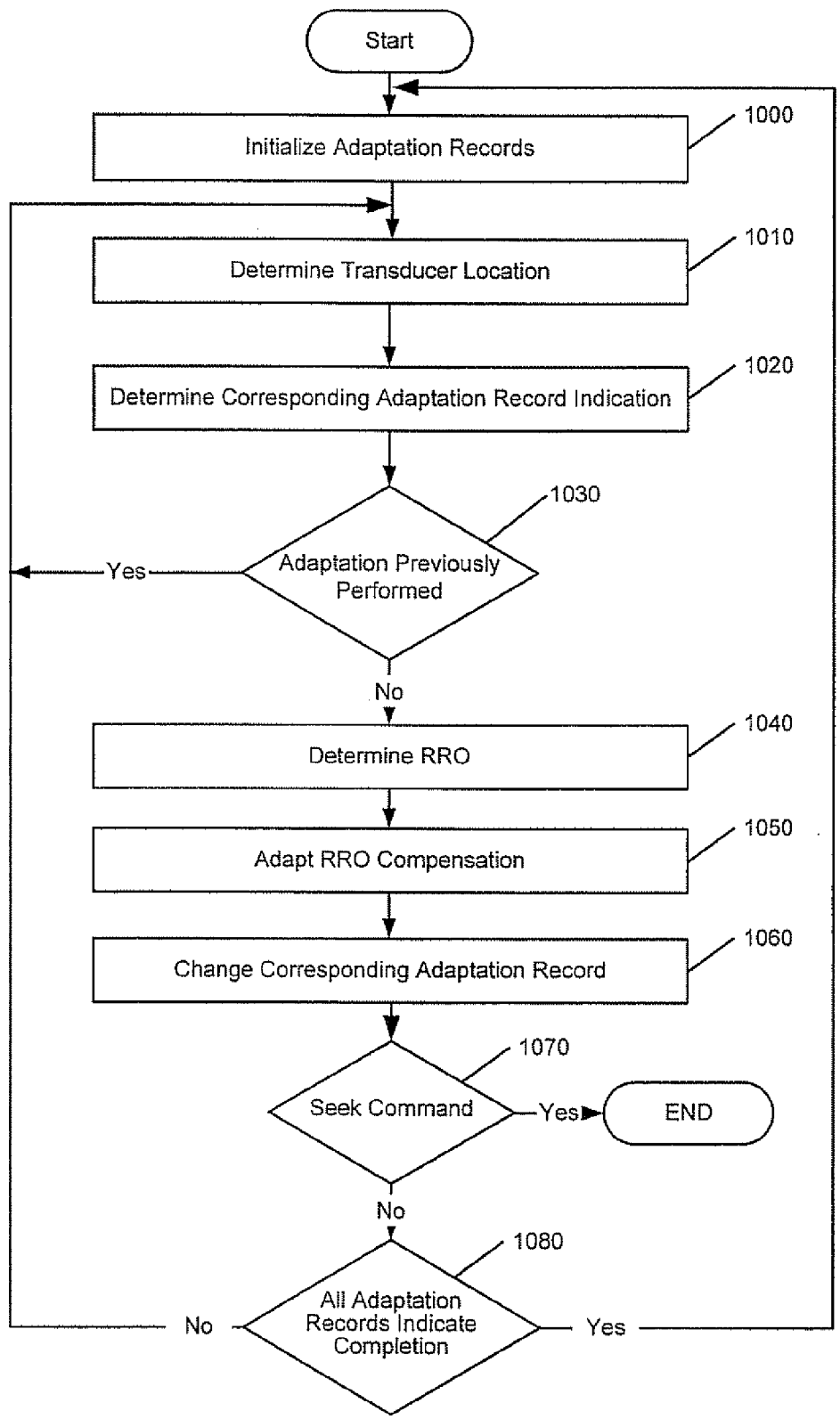
FIG. 10 is a flowchart illustration operations for tracking a status of whether compensation for repeatable runout has been adapted, and for selectively adapting or not adapting based on the status, in accordance with some embodiments of the present invention.

Referring now to FIG. 10, a flowchart of operations is shown for selectively adapting or not adapting compensation of RRO based on RRO records. The operations may be carried out at least in part by the controller 66 and/or the adaptive RRO compensator 504. Adaptation records are initialized (Block 1000) to indicate that adaptation of RRO compensation has not been carried out. The location of a transducer is determined (Block 1010) relative to a sector, group of sectors, and/or a radial zone of a disk. The application record that corresponds to the determined location is identified (Block 1020). A decision is made (Block 1030) based on the adaptation record to determine whether adaptation has previously been carried out. If adaptation has been performed (Block 1030), the operation then loops back to determine (Block 1010) a subsequent location of the transducer. If adaptation has not been performed (Block 1030), then RRO is sensed (Block 1040), such as based on a position error signal generated by the transducer sensing servo information on the disk. The RRO compensation is adapted (Block 1050) based on the RRO sensed at Block 1040. The associated adaptation record is changed (Block 1060) to indicate that adaptation of the RRO compensation has been carried out.

A decision is made (Block 1070) as to whether a seek command has been received. If a seek command has been received, the compensation operations may end to allow the seek command to be carried out. Otherwise, if no seek command has been received, a determination is made (Block 1080) as to whether all adaptation records indicate adaptation of the RRO compensation has been carried out, and, if not, the operation loops back to determine (Block 1010) a subsequent location of the transducer. If the decision (Block 1080) is that all adaptation records indicate adaptation of the RRO compensation has been carried out, operation loops back to initialize the adaptation records (Block 1000) to indicate that adaptation of RRO compensation has not been carried out, and the adaptation process can then repeat.

The foregoing discussion of the invention has been presented for purposes of illustration and description. Further, the description is not intended to limit the invention to the form disclosed herein. Consequently, variations and modifications commensurate with the above teachings are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments.

What is claimed is:

1. A method of adapting compensation for repeatable runout of sectors of a disk in a disk drive, the method comprising:
   compensating for repeatable runout of a plurality of sectors of the disk;
   tracking for at least some of the sectors of the disk a status of whether the compensation for repeatable runout has been adapted and forming corresponding records based on the statuses; and
   selectively adapting or not adapting the compensation for repeatable runout of the tracked sectors based on the records, wherein tracking a status of whether the compensation for repeatable runout has been adapted, comprises:
   initializing the records to a first logical value;
   setting individual ones of the records to a second logical value as the compensation for repeatable runout of the corresponding ones of the sectors is adapted; and
   resetting the records to the first logical value when the repeatable runout compensation has been adapted based on all of the sectors of the disk.

2. The method of claim 1, wherein:
   compensating for repeatable runout of a plurality of sectors of a disk comprises:
      sensing repeatable runout of the sectors of the disk;
      generating a repeatable runout compensation signal based on the sensed repeatable runout; and
      controlling positioning of a transducer adjacent to the disk based on the repeatable runout compensation signal, and
   selectively adapting or not adapting the compensation for repeatable runout of the tracked sectors based on the records comprises sensing an updated repeatable runout for at least one of the sectors, and selectively modifying or not modifying the repeatable runout compensation signal based on the sensed updated repeatable runout for the at least one of the sectors and based on the corresponding record.

3. The method of claim 2, wherein selectively modifying or not modifying the repeatable runout compensation signal comprises modifying the repeatable runout compensation signal based on the sensed updated repeatable runout for the sector when the corresponding record indicates that the repeatable runout compensation signal has not been modified based on position information from the sector.

4. The method of claim 3, wherein selectively modifying or not modifying the repeatable runout compensation signal comprises not modifying the repeatable runout compensation signal based on the sensed updated repeatable runout for the sector when the corresponding record indicates that the repeatable runout compensation signal has been modified based on position information from the sector.

5. The method of claim 1, wherein tracking a status of whether compensation for repeatable runout of the sectors has been adapted comprises tracking for each of the sectors of the disk a status of whether compensation for repeatable runout has been adapted and forming the records based on the statuses.

6. The method of claim 1, wherein the sectors comprise a first sector, a second sector, and a third sector, and wherein selectively adapting or not adapting the compensation for repeatable runout comprises:
   adapting the repeatable runout compensation of the first sector based on the records indicating that repeatable runout compensation has not been adapted for the first sector;
   not adapting repeatable runout compensation for the second sector based on the records indicating that repeatable runout compensation has been adapted for the second sector; and
   adapting repeatable runout compensation for the third sector based on the records indicating that repeatable runout compensation has adapted for the third sector, wherein the second sector is adjacent and between the first and third sectors.

7. The method of claim 1, wherein at least some of the plurality of tracked sectors each comprise a plurality of servo sectors.

8. The method of claim 1, wherein each of the records corresponds to a status of a different one of the tracked sectors.

9. The method of claim 1, wherein the records are reset to the first logical value when the compensation for repeatable runout has been adapted for all tracked sectors of the disk.

10. The method of claim 1, wherein selectively adapting or not adapting the compensation for repeatable runout of the tracked sectors based on the records comprises adapting the compensation for repeatable runout for a tracked sector based on the associated record having the first logical value.

11. The method of claim 10, wherein selectively adapting or not adapting the compensation for repeatable runout of the tracked sectors based on the records further comprises not adapting the compensation for repeatable runout for a tracked sector based on the associated record having the second logical value.

12. The method of claim 1, further comprising determining a location of a transducer relative to a plurality of radial zones of the disk, each of the radial zones is associated with a plurality of the tracks and a plurality of the sectors through which the tracks extend, and wherein:
   tracking a status of whether the compensation for repeatable runout of the sectors has been adapted comprises tracking for a plurality of the radial zones a status of whether the compensation for repeatable runout of the sectors associated with the zones has been adapted and forming the records based on the statuses; and
   selectively adapting or not adapting the compensation for repeatable runout comprises selectively adapting or not adapting the compensation for repeatable runout of the tracked sectors in the zones based on the records.

13. A servo controller comprising;
   an adaptive repeatable runout compensator that is configured to compensate for repeatable runout of a plurality of sectors of a disk, configured to track for at least some of the sectors of the disk a status of whether the compensation for repeatable runout has been adapted and to form corresponding records based on the statuses, configured to selectively adapt or not adapt the compensation for repeatable runout of the tracked sectors based on the records, configured to initialize the records to a first logical value, configured to set individual ones of the records to a second logical value as the compensation for repeatable runout of the corresponding ones of the sectors is adapted, and configured to reset the records to the first logical value when the compensation for repeatable runout of at least a predetermined number of the sectors has been adapted.

14. The servo controller of claim 13, wherein the adaptive repeatable runout compensator is configured to receive a signal that is indicative of repeatable runout of the sectors of the disk, configured to generate a repeatable runout compensation signal based on the received signal, and configured to control positioning of a transducer adjacent to the disk based on the repeatable runout compensation signal.

15. The servo controller of claim 14, wherein the adaptive repeatable runout compensator is configured to receive an indication of an updated repeatable runout for at least one of the sectors, and configured to selectively modify or not modify the repeatable runout compensation signal based on the received indication of the updated repeatable runout for the sector and based on the corresponding record.

16. The servo controller of claim 15, wherein the adaptive repeatable runout compensator is configured to modify the repeatable runout compensation signal based on the received indication of the updated repeatable runout for the sector when the corresponding record indicates that the repeatable runout compensation signal has not been modified based on position information from the sector.

17. The servo controller of claim 16, wherein the adaptive repeatable runout compensator is configured to not modify the repeatable runout compensation signal based on the received indication of the updated repeatable runout for the sector when the corresponding record indicates that the repeatable runout compensation signal has been modified based on position information from the sector.

18. The servo controller of claim 13, wherein the adaptive repeatable runout compensator is configured to track for each servo sector of the disk a status of whether repeatable runout of the servo sectors has been adapted and form a corresponding one of records based on the status, and configured to selectively adapt or not adapt the compensation for repeatable runout of one of the servo sectors based on the corresponding record.

19. The servo controller of claim 13, wherein at least some of the plurality of tracked sectors each comprise a plurality of servo sectors.

20. The servo controller of claim 13, wherein the adaptive repeatable runout compensator is configured to reset the records to the first logical value when the compensation for repeatable runout has been adapted for all tracked sectors of the disk.

21. The servo controller of claim 13, wherein the adaptive repeatable runout compensator is configured to adapt the compensation for repeatable runout for a tracked sector based on the associated record having the first logical value, and configured to not adapt the compensation for repeatable runout for a tracked sector based on the associated record having the second logical value.

22. A disk drive comprising:

a data storage disk;

a transducer configured to read servo information from the disk;

an actuator that is configured to position the transducer relative to the disk; and a servo controller that is configured to control positioning of the transducer by the actuator to compensate for repeatable runout of a plurality of sectors of the disk, configured to track for at least some of the sectors of the disk a status of whether the compensation for repeatable runout has been adapted and to form corresponding records based on the statuses, and configured to selectively adapt or not adapt the compensation for repeatable runout of the tracked sectors based on the records, configured to initialize the records to a first logical value, configured to set individual ones of the records to a second logical value as the compensation for repeatable runout of the corresponding ones of the sectors is adapted, and configured to reset the records to the first logical value when the compensation for repeatable runout of at least a predetermined number of the sectors has been adapted.

23. A computer program product for adapting compensation for repeatable runout of sectors of a disk in a disk drive, the computer program product comprising computer program code embodied in a magnetic, optical, or semiconductor memory computer-readable storage medium, the computer program code comprising:

computer program code that is configured to compensate for repeatable runout of a plurality of sectors of a disk;

computer program code that is configured to track for at least some of the sectors of the disk a status of whether the compensation for repeatable runout has been adapted and form corresponding records based on the statuses; and and computer program code that is configured to selectively adapt or not adapt the compensation for repeatable runout of the tracked sectors based on the records, configured to initialize the records to a first logical value, configured to set individual ones of the records to a second logical value as the compensation for repeatable runout of the corresponding ones of the sectors is adapted, and configured to reset the records to the first logical value when the compensation for repeatable runout of at least a predetermined number of the sectors has been adapted.

* * * * *